United States Patent
Cewers et al.

[11] Patent Number: 6,044,849
[45] Date of Patent: Apr. 4, 2000

[54] FLUID PRESSURE RELIEF VALVE WITH VARIABLE OPENING PRESSURE

[75] Inventors: Göran Cewers, Mölle; Hakan Johansson, Sundbyberg, both of Sweden

[73] Assignee: Siemens Elema AB, Solna, Sweden

[21] Appl. No.: 09/233,908

[22] Filed: Jan. 21, 1999

[30] Foreign Application Priority Data

Jan. 28, 1998 [SE] Sweden .................................. 9800229

[51] Int. Cl.[7] .................................................. F16K 15/00
[52] U.S. Cl. ........................ 132/543.17; 137/537; 137/540
[58] Field of Search ................. 251/129.15; 137/543.17, 137/537, 540, 522, 523, 528

[56] References Cited

U.S. PATENT DOCUMENTS

| | | | |
|---|---|---|---|
| 3,043,333 | 7/1962 | Kugler | 137/537 |
| 3,884,260 | 5/1975 | Hilgert | 137/537 |
| 3,996,963 | 12/1976 | Winquist | 137/543.17 |
| 4,681,298 | 7/1987 | Bodine et al. | 251/129.15 |
| 4,827,975 | 5/1989 | Steiger | 137/537 |
| 4,984,549 | 1/1991 | Mesenich | 251/129.15 |
| 4,993,456 | 2/1991 | Sule | 251/129.15 |
| 5,020,774 | 6/1991 | Christianson | 251/129.15 |
| 5,027,871 | 7/1991 | Guenther | 251/129.15 |
| 5,501,425 | 3/1996 | Reinicke et al. | 251/129.15 |
| 5,592,905 | 1/1997 | Born | 251/129.5 |
| 5,593,133 | 1/1997 | Hunnicutt | 251/129.15 |
| 5,860,631 | 1/1999 | Feigel | 251/129.15 |

*Primary Examiner*—Henry Bennett
*Assistant Examiner*—Joanne Y. Kim
*Attorney, Agent, or Firm*—Hill & Simpson

[57] ABSTRACT

A fluid pressure release valve includes an aperture through which fluid can flow. An element is movable to unseal the aperture and to open the valve when a force exerted by the fluid in the valve exceeds a predetermined force. An electromagnetic biasing arrangement biases the element to seal the aperture and hold the valve closed against the escape of fluid with the predetermined force. The applied bias is variable according to changes in the sensed position of the element and a monitoring arrangement, cooperable with the solenoid, monitors the changes in its electrical properties as a shaft moves in the monitoring arrangement, indicating a change in position of the element. The monitoring arrangement also varies the bias to reduce the predetermined force responsive to the sensed change in position of the element indicating an opening of the valve.

7 Claims, 3 Drawing Sheets

FLUID PRESSURE RELIEF VALVE WITH VARIABLE OPENING PRESSURE

BACKGROUND OF THE INVENTION

1. Field of the Invention

The present invention relates to a fluid pressure release valve and in particular to a pressure release valve in which the opening pressure can be varied.

2. Description of the Prior Art

Fluid pressure release valves are often used as safety valves in equipment in which the presence of fluids at high pressures may be dangerous and which may cause damage to the equipment or the user. Such pressure release valves include some form of movable element which may be biased to close the valve with a predetermined force, the movable element being arranged within the valve such that pressure from the fluid also can exert a force on the element to counter the predetermined force. When this counter force exceeds the predetermined force the element moves to open the valve and allow release of the fluid pressure. Often the means used to bias the head may be chosen to provide a load which may be varied to allow the valve to open at different pressures dependent on the circumstances of its use.

One such pressure release valve is that commonly used in kitchen pressure cookers. Here weights are used to bias a sealing head to close the valve with a force determined by the weights used. Relatively crude control over the setting of the release pressure may be made allowing for the weights to be changed and the arrangement is such that in the absence of any bias or fluid pressure the valve is closed. Springs have also be employed to exert the mechanical closing force on the sealing head. One end of the spring is attaches to the sealing head and the other may be attached to a variable position mounting, such as to the end of a threaded rod.

Setting of the release pressure may be achieved by screwing or unscrewing the rod.

Solenoid valves, in which a solenoidal electromagnet is used to bias a movable element to close a valve, are also well known and are capable of providing a more refined control of the release pressure setting since the current through the solenoid windings can be well controlled. One such valve is described in European Patent 484 684, and is used as a pressure release valve for breathing gas in a mechanical ventilator. This valve has a sealing head which is located toward the end of one arm of a pivoting balance and a movable element, in the form of a piston, is located toward the end of the other arm of the balance. The piston is movable in response to energization of an electromagnet to pivot the balance and bias the sealing head toward the valve opening with a force determined by the current supplied to the electromagnet. Additionally, springs are arranged to cooperate with the piston such that in the absence of supply current the valve is in the open position.

Regardless of whether mechanical, electrical or a combination biasing means is provided in the pressure release valve the known valves have a problem that the operation of the valve itself may generate undesirable pressure oscillations in the equipment in which it is incorporated. This is because as the fluid pressure within the valve increases to overcome the applied bias on the sealing head, the valve opens, the pressure falls and the applied bias causes the valve to close. The pressure of the fluid, however, may still be sufficiently high so that as the valve closes the pressure within the valve increases to re-open the valve, thus pressure oscillations may be generated.

SUMMARY OF THE INVENTION

It is an object of the present invention to provide a fluid pressure release valve which allows the opening pressure to be varied which avoids, or substantially minimizes, the generation of pressure oscillations.

The above object is achieved in accordance with the invention in a valve wherein, on sensing an opening movement of the valve, the applied bias is reduced, even to zero or a negative value (i.e. reversed to aid the opening), for a time which may even be until a manually resetting takes place, in order to counter the effects of a reduction in the fluid pressure as the valve opens.

The sensor can employ an electromagnet arranged so that its electrical properties, such as inductance or voltage (back electromotive force (EMF)), varies as the valve opens. For ease of construction the same electromagnet may also be arranged to provide some or all of the applied bias, in this way the applied bias can be rapidly and accurately varied by varying the control current supplied to the magnet.

DESCRIPTION OF THE PREFERRED EMBODIMENTS

Figure 1:
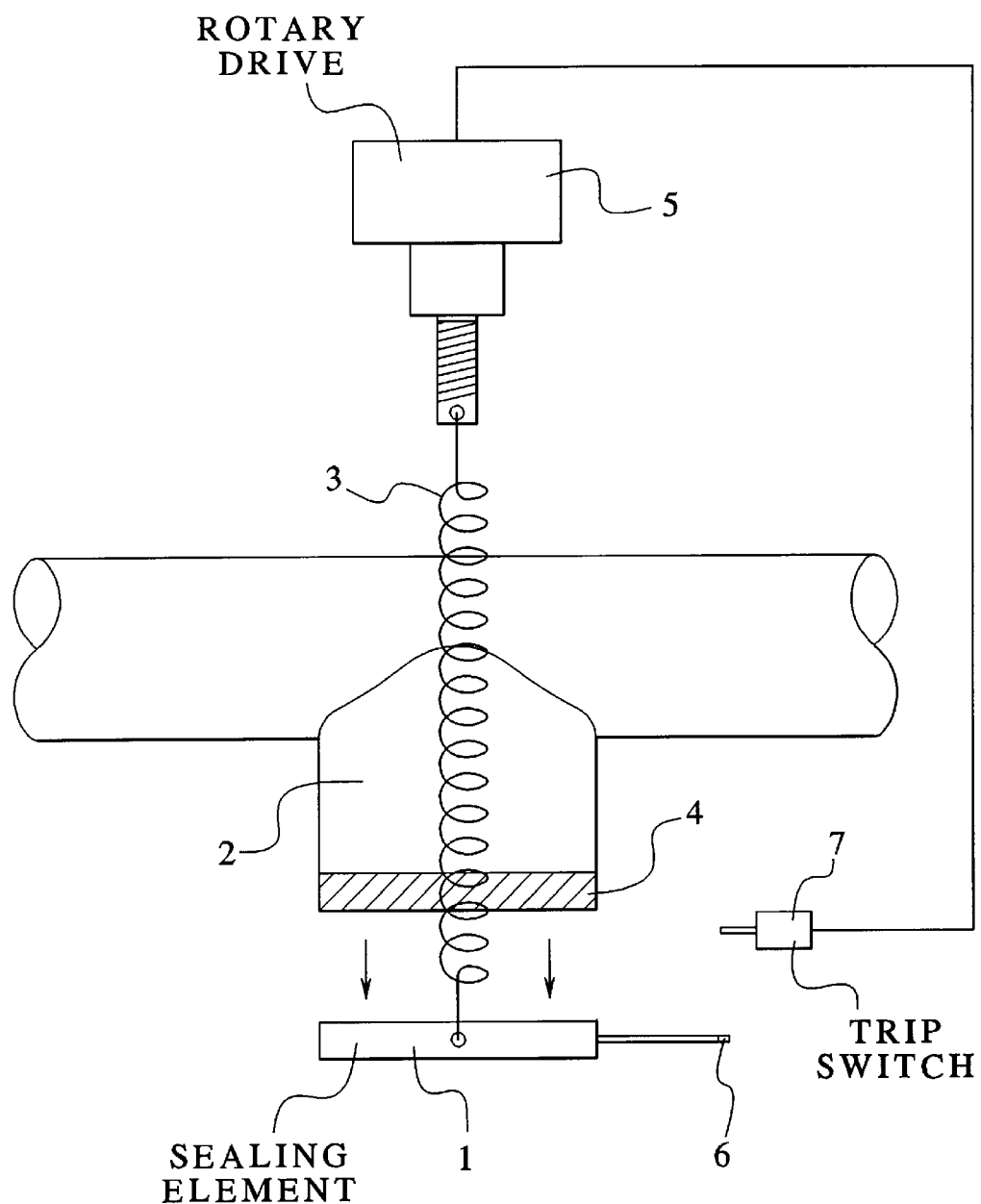
FIG. 1 is a schematic illustration of a pressure release valve according to the present invention having spring biasing.

In FIG. 1, a pressure release valve is shown in its open position with heavy arrows indicating the direction of the force on a movable sealing element 1 provided by the pressure of a fluid within the valve. The sealing element 1 is biased toward the valve aperture 2 by variable tension springs 3 (only one shown) so that in the absence of sufficient fluid pressure the element 1 is urged against a resiliently compressible sealing ring 4 which is situated around the periphery of the open end of the aperture 2, with a predetermined force to form a fluid tight seal.

The springs 3 each have one end attached to the sealing element 1 and the other to a threaded portion of a rotary drive 5 (only one shown) so that as the drive 5 rotates the exposed threaded portion extends or contracts to vary the tension in the spring 3 and so vary the biasing load on the element 1.

The sealing element 1 is further provided with a projection 6 which can cooperate with a trip switch 7 that is connected in an electrical circuit with the drive 5 to change the state of the switch 7 and operate the drive 5 as the sealing element 1 moves past the switch 7.

In use the pressure release valve remains closed with the sealing element 1 biased against the sealing ring 4 of the aperture 2 with a predetermined force set by the tension in the springs 3 until the pressure of the fluid within the valve exerts a force to overcome the predetermined force. The element 1 then moves away from the aperture 2 to open the valve and release the fluid. This reduces the force on the sealing element 1 and the biasing force of the springs 3 would tend to return the sealing element 1 to the closed valve position. However, the trip switch 7 is positioned so that as the sealing element 1 moves away from the aperture 2 the projection 6 on the element 1 interacts with the switch 7 to complete an electric circuit and activate the rotary drive 5 when activated, the drive 5 rotates to lengthen its exposed threaded portion by a set amount and thereby reduce the tension in the spring 3. This enables a reduced fluid pressure to maintain the sealing element 1 away from the ring 4 and keep the valve open.

As the fluid pressure further decreases it can no longer provide a sufficient force to counter the reduced bias of the springs 3 and the sealing element 1 moves toward the sealing ring 4, returning the valve to its closed position. As the projection 6 passes the switch 7 the state of the switch 7 can again be changed so that the drive 5 is made to retract its threaded portion to reapply the original level of biasing load on the element 1, thereby returning the valve to its original state.

Alternatively, the switch 7 can be of a type known in the art which can change state automatically after a predetermined time (which could be programmed into the switch or preset to a known fixed value) to activate the drive 5 to retract its threaded portion to its original position.

Figure 2:
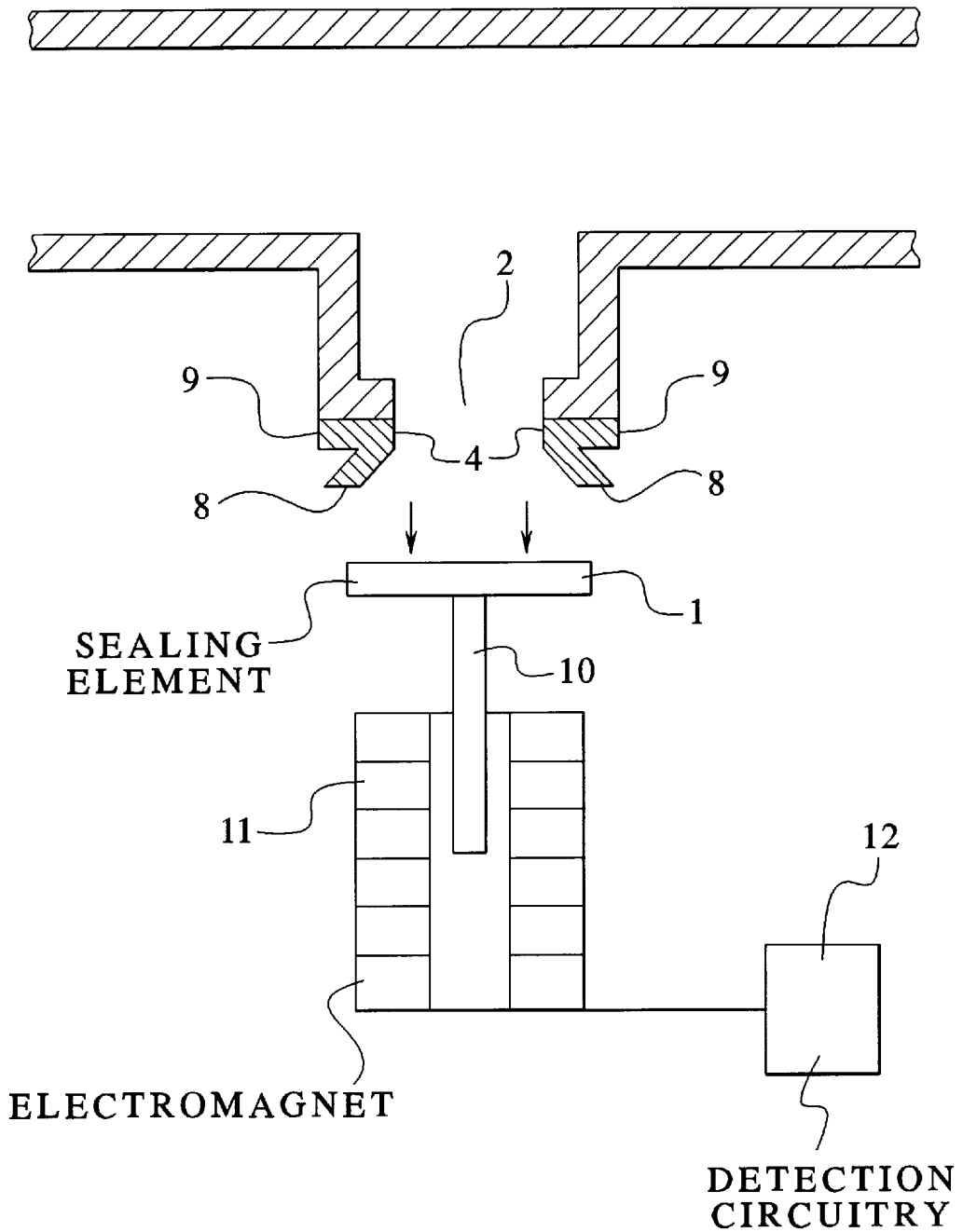
FIG. 2 shows a sectional view of a pressure release valve according to the present invention incorporating electromagnetic biasing.

A second embodiment of a valve according to the present invention is shown in FIG. 2 in which the components that are similar to those of FIG. 1 are given the same reference numeral. Considering now FIG. 2, a pressure release valve is provided with an aperture 2 through which a fluid in the valve can escape. This aperture 2 has a sealing ring 4 of resiliently compressible material around its periphery against which a sealing head 1 can be biased with a predetermined force to form a fluid tight seal. The sealing ring 4 is shaped with a lip 8 that can move against the body 9 of the sealing ring 4 as the sealing head 1 moves to close the valve.

This arrangement is particularly advantageous since it allows the head 1 to move a greater distance away from the aperture 2 before the valve opens than would have been the case if the ring 4 had been of the same material formed with a cylindrical profile (i.e. of known 'O' ring construction) This greater movement during the opening of the valve may be used to provide an opening movement sensor with a greater signal to detect, increasing its reliability to detect opening, as will become apparent to those skilled in the art from the following description. Such a ring 4 further advantageously dampens the closing of the valve and so reduces "knocking" sounds which can be particularly annoying to patients and staff in hospitals when the valve is used in a ventilator. Also, because of its enhanced compressibility the ring 4 can accommodate greater mechanical differences between the sealing element 1 and the periphery of the aperture 2.

The sealing head 1 has attached to its underside one end of a shaft 10 which is arranged with part of its length movably located within a solenoidal electromagnet 11 to form a variable core. When energized the electromagnet 11 can cooperate with the shaft 10 to bias the sealing head 1 against the sealing ring 4 to hold the valve closed with a predetermined force. As before, a fluid pressure within the valve provides a force on the sealing head 1 (in a direction as shown by the heavy arrows) which, when greater than the predetermined force provided by the electromagnetic arrangement 10, 11, causes the head 1 to move away from the sealing ring 4 and the valve to open to release the fluid pressure. This reduction in fluid pressure would, in prior art devices, allow the head 1 to reseal against the ring 4 and close the valve until the fluid pressure increased sufficiently to re-open the valve. However circuitry 12 is provided to detect movement of the shaft 10 in the solenoidal electromagnet 11 and to control the current flowing through the electromagnet 11 dependent on this detected movement. In this example the current is reduced as the valve opens, reducing the biasing load on the head 1 which is tending to return it to seal against the ring 4. Thus a reduced fluid pressure can hold the head 1 away from the ring 4 and maintain the valve open. Indeed the current may even be reversed so that the electromagnet 11 now acts to bias the valve open.

The circuitry 12 operates to detect one or both of the back EMF (voltage) generated as the shaft moves or the inductance changes generated by positional changes of the shaft 10 in the solenoid 11 in manners common in the art. The detected EMF or inductance is compared with a reference value in a comparator of known construction, the output of which is used to control the current supplied to the solenoid 11.

Additionally, the measured inductance can be related directly to the absolute position of the shaft 10 in the solenoid 11. An electrical signal representative of the magnitude of the measured inductance can therefore be used to provide an indication of the absolute position of the valve element 1, and hence to monitor the correct operation of the valve.

After some time the bias may be returned to the original level, for example after a predetermined time or when the circuitry 12 senses movement of the shaft 10 that indicates a closing of the valve, when sufficient pressure has been released. Thus the valve may be restored to its original state with a minimum of operationally induced fluid pressure oscillations.

Figure 3:
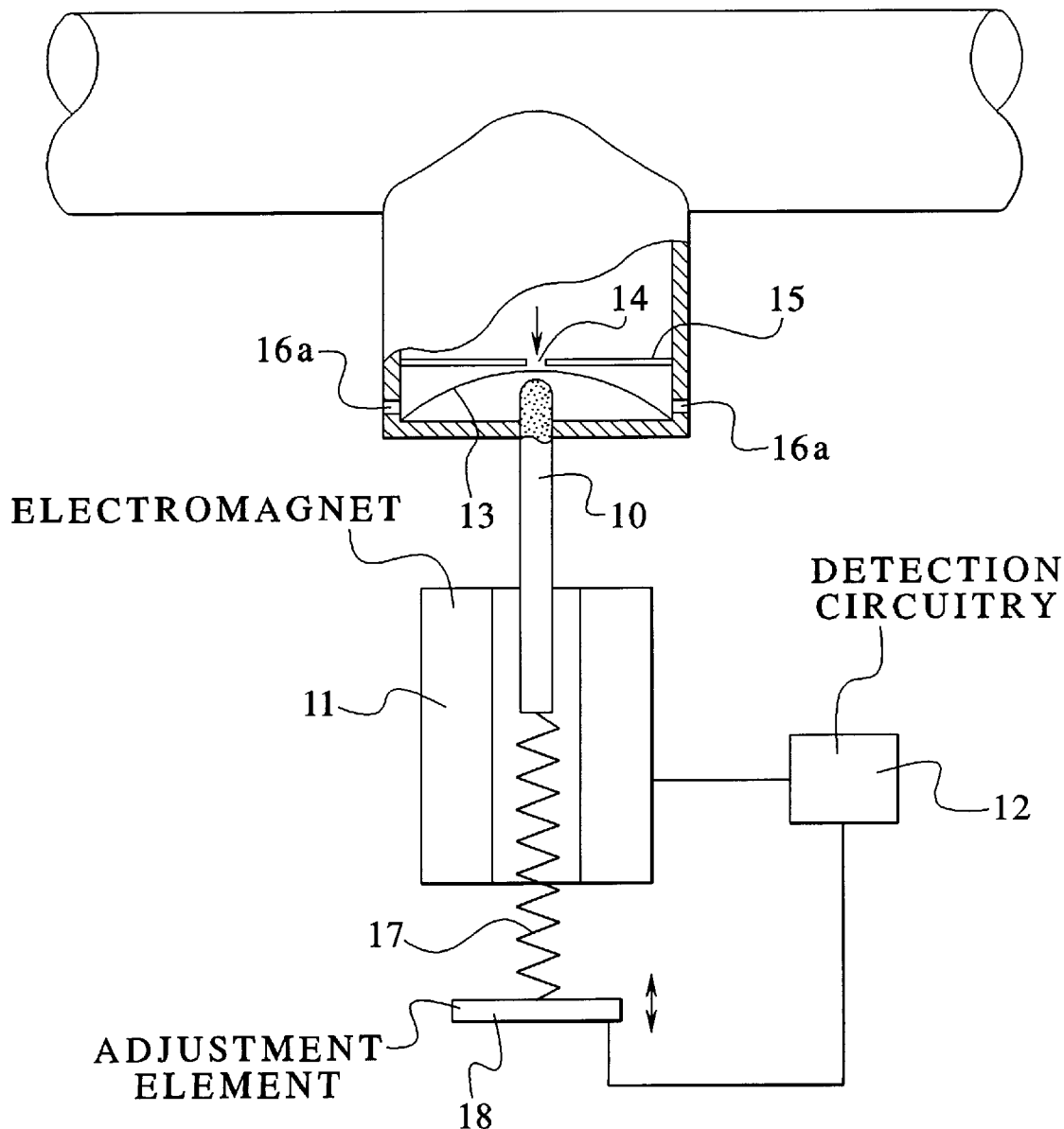
FIG. 3 shows a pressure release valve according to the, 25 present invention incorporating spring biasing and an electromagnetic position sensor.

A third embodiment of a fluid pressure release valve according to the present invention is shown in FIG. 3. Here a shaft 10 is arranged to urge a diaphragm 13 against an opening 14 in a plate 15 to close the valve against fluid egress past the plate and through holes $16_a$, $16_n$ arranged in the side wall of the valve. A spring 17 cooperates with the shaft 10 to apply a predetermined force on the diaphragm 13. This maintains the valve in a closed position until a force (shown by the heavy arrow) created by the pressure of fluid in the valve overcomes the predetermined force and pushes the diaphragm away from the opening in the plate. A solenoidal electromagnet 11 is arranged so that at least some of the shaft 10 forms a core, movable as the diaphragm moves to change the electrical characteristics of the electromagnet 11. As previously described, circuitry 12 can be arranged to monitor such changes and to control current supplied to the electromagnet 11 consequent on the movement of the shaft 10.

Alternatively, as shown in FIG. 3, the spring 17 may be attached to an adjustment element 18 which can move as indicated to vary the tension in the spring 17 and so the predetermined force on the diaphragm 13. The signal output from the circuitry 12 is here used to control the movement of the adjustment element 18 to reduce the bias on the shaft 10 as the valve opens.

Although modifications and changes may be suggested by those skilled in the art, it is the intention of the inventors to embody within the patent warranted hereon all changes and modifications as reasonably and properly come within the scope of their contribution to the art.

We claim as our invention:

1. A fluid pressure release valve comprising:
   an aperture adapted to receive a fluid flow therethrough;
   a movably mounted element disposed to, in a first position, seal said aperture to prevent fluid flow through said aperture and to move to a second position to unseal said aperture to allow fluid flow through said aperture when a force exerted by said fluid exceeds a predetermined force;

biasing means connected to said movably mounted element for normally biasing said element with a bias force, which normally equals said predetermined force, to maintain said movably mounted element in said first position to seal said aperture, said biasing means comprising means for varying said bias force from said predetermined force; and monitoring means for sensing movement of said movably mounted element from said first position and for cooperating with said means for varying to reduce said predetermined force dependent on an amount of said change in position of said movably mounted element as said movably mounted element moves from said first position to said second position to prevent oscillation of said movably mounted element.

2. A fluid pressure release valve as claimed in claim 1 wherein said monitoring means comprise an electromagnet having electrical characteristics which vary dependent on movement of said movably mounted element, and means for monitoring variations in said electrical characteristic of said electromagnet.

3. A fluid pressure release valve as claimed in claim 2 wherein said electromagnet comprises a solenoid having a shaft forming a core of said solenoid, said shaft and said solenoid being relatively movable dependent on movement of said movably mounted element.

4. A fluid pressure release valve as claimed in claim 3 wherein said electromagnet has an inductance, and wherein said means for monitoring variations in the electrical characteristics of said electromagnet comprise means for measuring said inductance.

5. A fluid pressure release valve as claimed in claim 3 wherein relative movement between said shaft and said solenoid produces a back electromotive force, and wherein said means for monitoring the electrical characteristics of said electromagnet comprise means for measuring said back electromotive force.

6. A fluid pressure release valve as claimed in claim 2 wherein said electromagnet simultaneously forms said biasing means.

7. A fluid pressure release valve as claimed in claim 6 wherein said electromagnet interacts with said movably mounted element for increasing said bias force as current supplied to said electromagnet increases.

* * * * *